United States Patent
Luna et al.

(10) Patent No.: US 6,418,165 B1
(45) Date of Patent: Jul. 9, 2002

(54) SYSTEM AND METHOD FOR PERFORMING INVERSE QUANTIZATION OF A VIDEO STREAM

(75) Inventors: Amelia Carino Luna; Jason Naxin Wang, both of San Jose; Richard Lawrence Williams, Scotts Valley, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/310,531

(22) Filed: May 12, 1999

(51) Int. Cl.[7] .................................................. H04B 1/66
(52) U.S. Cl. ...................... 375/240; 382/251; 382/246; 382/250; 382/233
(58) Field of Search ............................ 375/240, 240.03, 375/240.04, 240.12, 240.13, 240.25; 348/404.1, 400.1; 382/251, 246, 233, 250

(56) References Cited

U.S. PATENT DOCUMENTS

| | | | |
|---|---|---|---|
| 5,875,266 A | * 2/1999 | Fukuda et al. | 382/251 |
| 5,982,935 A | * 11/1999 | Arbel | 372/233 |
| 6,028,600 A | * 2/2000 | Rosin et al. | 348/13 |
| 6,122,321 A | * 9/2000 | Sazzard et al. | 375/240.03 |

FOREIGN PATENT DOCUMENTS

EP   0 572 263 A2   5/1993

OTHER PUBLICATIONS

International Search Report PCT/US00/11764, Apr. 27, 2000, 7 pages.
Sheng–Mei Shen, et al., "*A Method of Adaptive Prediction In The Transform Domain*", pp. 709–712, vol. 143, Sep. 10, 1997, XP0001999865.
Puri, et al., "*Improvements In DCT Based Video Coding*", Feb. 12, 1997, XP0001998866, paragraph 3.1.1.
Mizosoe, et al., "*Software Implementation Of MPEG–2 Decoder On VLIW Mediaprocessors*", Proceedings of the Media Processors 2000, Jan. 27–Jan. 28, 2000, vol. 3970, pp. 16–26, XP002146462.

* cited by examiner

*Primary Examiner*—Chris Kelley
*Assistant Examiner*—Shawn S. An
(74) *Attorney, Agent, or Firm*—Blakely, Sokoloff, Taylor & Zafman LLP

(57) ABSTRACT

A system and method for performing a coefficient reconstruction in a decoder. The method comprises receiving a transmitted coefficient of a first block. The method also comprises retrieving a former reconstructed value. Additionally, the method comprises executing a first arithmetic operation to generate a reconstructed value of the transmitted coefficient. The first arithmetic operation is performed using the transmitted coefficient and the former reconstructed value. Finally, the method comprises replacing the former reconstructed value with the new reconstructed value.

5 Claims, 4 Drawing Sheets

SYSTEM AND METHOD FOR PERFORMING INVERSE QUANTIZATION OF A VIDEO STREAM

FIELD OF THE INVENTION

The present invention relates to decoding a video bit stream. More particularly, the present invention relates to decoding elements of a video bit stream prior to performing a general data reconstruction.

BACKGROUND

Improvements in communication networks have led to new designs that support high bandwidths and multiple devices. In conjunction with the advent of improved communication networks, microprocessors with high operating frequencies and large memory storage are also being developed. Accordingly, the combination of high bandwidth communication networks and high speed microprocessors has resulted in standard text communication being replaced with multimedia communication. Multimedia communication involves using a combination of audio, video, text, or any combination thereof to communicate between multiple devices. A variety of standard multimedia protocols have been developed to support multimedia communication. For example, Moving Pictures Expert Group ("MPEG") has developed MPEG-1 (coding of moving pictures and associated audio for digital storage media) and MPEG-2 (generic coding of moving pictures and associated audio).

FIG. 1 illustrates a typical system used to perform multimedia communication. In particular system 100 includes a video encoder 105 coupled to a communications channel 106. Communications channel 106, in turn, is coupled to a video decoder 107. Typically, the communications channel 106 includes an asynchronous transfer mode network, a phone line, or a frame relay network.

Encoder 105 is used to compress video data 110 and transmit the encoded data on communications channel 106. Subsequently, the transmitted data is decompressed by video decoder 107 and video data 110 is reconstructed on video out 195. As illustrated in FIG. 1, video encoder includes an encoder 120 coupled to and a variable length encoder 140. Encoder 120 includes a motion estimator 130. Motion estimator 130 exploits the temporal redundancies in video data 110 to generate compressed data. In particular, motion estimator 130 determines the change in pixel values between sets of blocks.

Encoder 120, on the other hand, comprises a discrete cosine transform ("DCT") encoder that exploits the spatial redundancies in video data 110 to generate compressed data. In particular, a frame of data in video data 110 is typically divided into 8×8 blocks of pixels. Subsequently, a two-dimensional DCT is applied to the block that results in an 8×8 block of DCT coefficients consisting of a DC coefficient and sixty three AC coefficients. For Intra-coded Macroblocks, the DC coefficients of a given block are coded differentially with respect to a previous block. Typically, the differential coding of DC coefficients is performed for a slice of a picture. Intra AC coefficients, however, are quantized using a variable step size from block to block.

The compressed data streams are transferred to variable length encoder 140 where, for a given picture of video data 110, a first quantized IntraMacroBlock ("lntra-MB") is generated from a variable length code table. The Intra-MBs of the picture are coded differentially with respect to the previous adjacent Intra-MB. Typically, a main profile at main level ("MP@ML") MPEG-2 system includes 1350 MacroBlocks ("MBs") per picture—some of which some are Intra-MBs. In the prior art, a quantized MB includes four 8×8 luminance ("γ") blocks of quantized DCT coefficients and two 8×8 chrominance blocks of quantized DCT coefficients—a Cb block and a Cr block. After the MB generation, system mux 150 generates a transport stream or a program stream and the MBs are transmitted across communications channel 106.

The transmitted MBs are reconstructed in video decoder 107. In particular, system demux 160 performs the complement of system mux 150 and generates a string of MBs to variable length decoder 170. Variable length decoder 170 decodes the entire MB according to the variable length code table. Subsequently, the decoded MB is transferred to decoder 190 and motion compensator 180 where the MB is processed. Typically, decoder 190 and motion compensator 180 reside in a single computing engine that follows a very-long-instruction-word ("VLIW") architecture. Accordingly, the MB processing which includes DC coefficient reconstruction and inverse quantization is performed within the VLIW processor. The VLIW processor allows video decoder 107 to execute complicated commands that yield high parallelism, as found in the reconstruction of multiple Intra-MBs. The VLIW processor further allows the video decoder to process large blocks of data in parallel. The use of a VLIW processor to perform data reconstruction on intra-coded blocks, however, results in numerous disadvantages.

One disadvantage results from the characteristic of the Intra-MB. In particular, Intra-MBs typically include DC coefficients inter-dispersed among AC coefficients. Thus, in order to process a string of transmitted Intra-MBs, the VLIW has to mask the blocks of each transmitted Intra-MB to isolate the DC coefficients and perform DC reconstruction. Another disadvantage results from the differential coding used to generate the DC coefficients. Specifically, the differential coding requires that the VLIW processor generate multiple memory address pointers to multiple DC coefficients. Yet another disadvantage results from the inverse quantization ("IQ") of the DC and AC coefficients for a given block. In particular, the IQ of AC coefficients comprises a plurality of steps including a multiplication operation. As previously described, DC coefficients, however, are coded differently from AC coefficients and need to be handled differently. Thus, the VLIW processor typically extracts the DC coefficient (using masks and gated logic) and replaces the DC coefficient with a value that accounts for the multiplication operation prior to the inverse quantization of the DC and AC coefficients.

SUMMARY OF THE INVENTION

The present invention provides a method for performing a coefficient reconstruction in a decoder. The method comprises receiving a transmitted coefficient of a first block. The method also comprises retrieving a former reconstructed value. Additionally, the method comprises executing a first arithmetic operation in the decoder to generate a reconstructed value of the transmitted coefficient. The first arithmetic operation is performed using the transmitted coefficient and the former reconstructed value. Finally, the method comprises replacing the former reconstructed value with the new reconstructed value.

The present invention also provides a system having a plurality of devices configured to generate a reconstructed coefficient. The system comprises a variable length decoder. For one embodiment, the variable length decoder is operable to receive a first transmitted Intra-Macroblock comprising a plurality of transmitted coefficients and generate an Intra-Macroblock comprising a plurality of reconstructed coefficient. The system further comprises a processor coupled to the variable length decoder. For another embodiment, the processor is operable to generate a picture from the Intra-Macroblock comprising a plurality of reconstructed coefficients.

Additionally, the present invention provides a method for performing inverse quantization in a decoder. The method comprises receiving a transmitted coefficient of a first block. The method also comprises retrieving a former reconstructed value. Additionally, the method comprises executing a first arithmetic operation in the decoder to generate a reconstructed value of the transmitted coefficient. For one embodiment, the first arithmetic operation is performed using the transmitted coefficient and the former reconstructed value. Furthermore, the method comprises generating an inverse quantized DC coefficient from the reconstructed value of the transmitted coefficient.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

An apparatus and method for implementing pre-processing of DC coefficients generated by a discrete cosine transform ("DCT") encoder is disclosed. For one embodiment, the DCT encoder generates DC coefficients according to an intra block format. Thus, the DC coefficients are differentially coded from block to block. Accordingly, the method describes performing DC coefficient reconstruction in a variable length decoder ("VLD") of a video decoder.

For another embodiment, the method describes performing an inverse quantization on the reconstructed DC coefficients via a variable length decoder. The inverse quantization performed in the variable length decoder reduces the steps performed during data reconstruction. Thus, an intended advantage of an embodiment of the present invention is to provide a method for pre-processing DC coefficients of an Intra-Macroblock ("Intra-MB") prior to data reconstruction by a processor of a video decoder. Another intended advantage of an embodiment of the invention is to reduce the steps performed during the inverse quantization of DC and AC coefficients for a given block.

Figure 1:
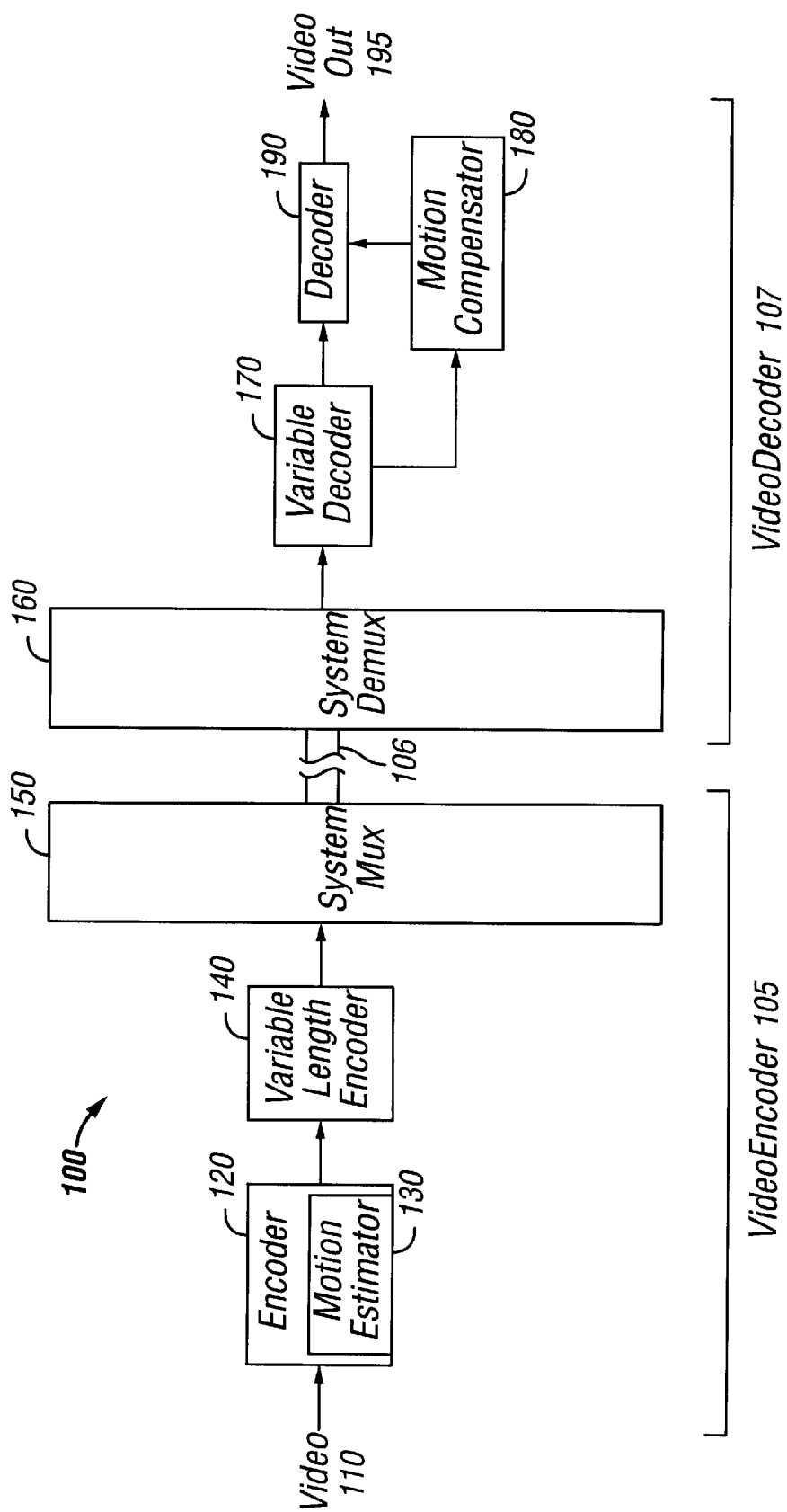
FIG. 1 illustrates a multimedia communication system.
Figure 2:
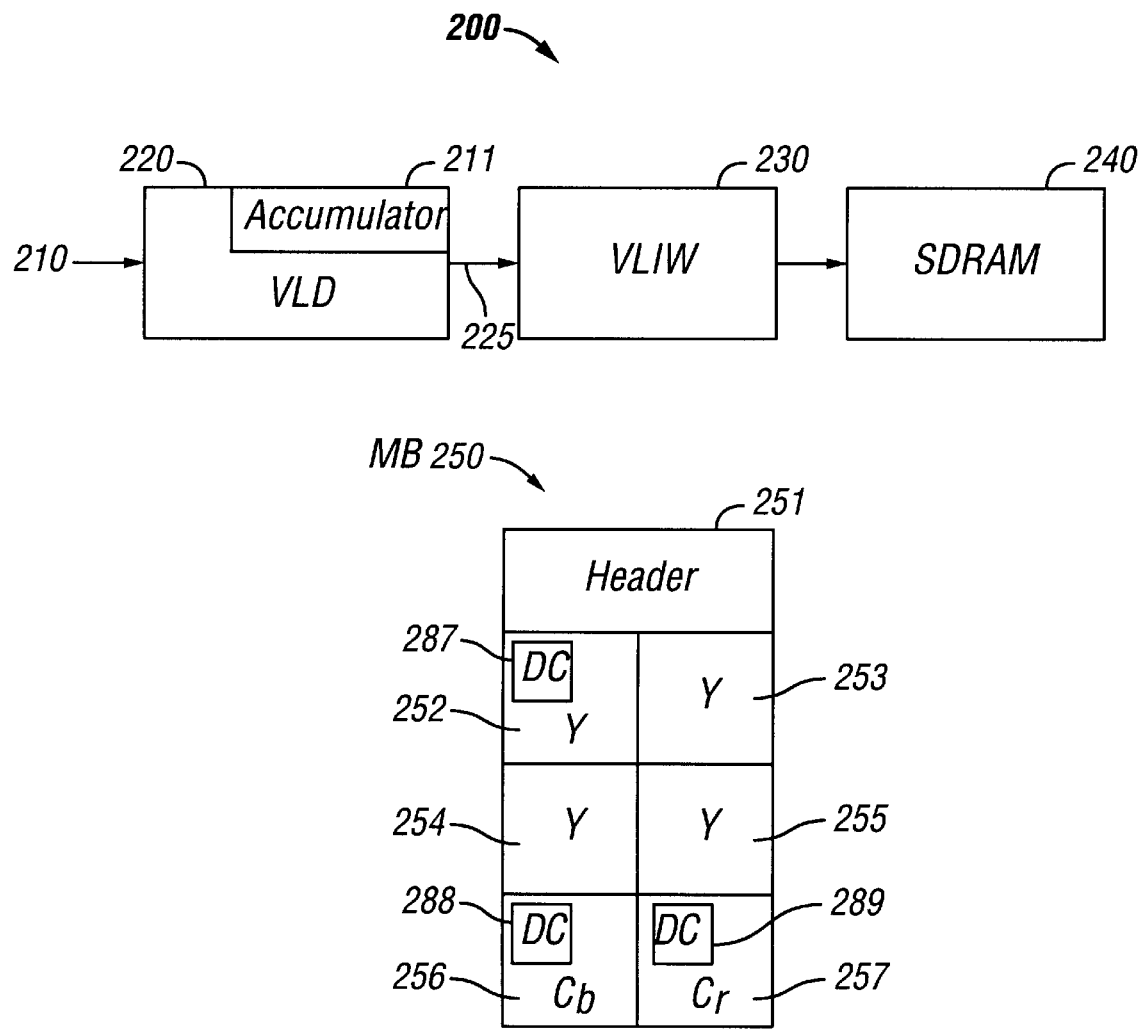
FIG. 2 shows one embodiment of a video decoder.

FIG. 2 shows one embodiment of a video decoder. In particular, system 200 comprises a very-long-instruction-word ("VLIW") processor 230 coupled to a variable length decoder (220) and a memory (SDRAM 240). As further illustrated in FIG. 2, VLD 220 is also coupled to input 210. Input 210 receives demultiplexed Intra-MBs transmitted across a communications channel. For one embodiment, for each Intra-MB received on input 210, VLD 220 decodes the Intra-MB according to a variable length code table (not shown). For another embodiment, VLD 220 performs a DC reconstruction on the DC coefficients of the decoded Intra-MB. Accordingly, an Intra-MB with reconstructed DC coefficients is generated on line 225. The DC reconstruction performed by VLD 220 results in a serial process where pre-processed Intra-MBs are generated on line 225, thus allowing VLIW 230 to perform parallel data reconstruction on the blocks of an Intra-MB.

For yet another embodiment, VLD 220 performs an inverse quantization ("IQ") on the reconstructed DC coefficients, thus generating an Intra-MB on line 225 with inverse quantized DC coefficients. The inverse DC quantization performed by VLD 220 results in a serial process where Intra-MBs with inverse quantized DC coefficients are generated on line 225, thus allowing VLIW 230 to perform IQ on a block of the Intra-MB. For one embodiment, the IQ of all blocks within an Intra-MB generates a 16×16 luminance block and two 8×8 chrominance blocks of pixels that are stored in SDRAM 240. For another embodiment, while VLIW 230 is processing an Intra-MB a subsequent Intra-MB is being generated by VLD 220.

MB 250 illustrates one embodiment of the Intra-MBs generated on line 225. In particular, Intra-MB 250 comprises a header field (251), four 8×8 luminance ("γ") blocks of quantized DCT coefficient (γ252–γ255), and two 8×8 chrominance blocks (Cb 256 and Cb 257). Each of the blocks of Intra-MB 250 comprise sixty-four DCT coefficients—one DC coefficient and sixty-three AC coefficients. For illustrative purposes, however, only the DC coefficient (DC 288) of the first luminance block (γ252) is shown. FIG. 2 also illustrates the DC coefficient of Cb 256 (DC 288) and the DC coefficient of Cr 257 (DC 289).

For one embodiment, the DC coefficients of Intra-MB 250 are reconstructed DC coefficients. In particular, the reconstructed DC coefficients of the γ blocks of Intra-MB 250 are generated from the DC coefficients of γ blocks in a prior Intra-MB. Similarly, the reconstructed DC coefficient of Cb 256 is generated from a prior Cb block and the reconstructed DC coefficient of Cr 257 is generated from a prior Cr block.

For one embodiment, the reconstructed DC coefficients of a first Intra-MB are stored in accumulator 211. Subsequently, using the reconstructed DC coefficients stored in accumulator 211, VLD 220 performs an arithmetic computation on the DC coefficient of the next Intra-MB to generate the reconstructed DC coefficients of the next Intra-MB. The arithmetic operation performed by VLD 220 and the use of accumulator 211 is further described below in conjunction with FIG. 3.

For another embodiment, the DC coefficients of Intra-MB 250 are inverse quantized DC coefficients. In particular, VLD 220 performs an inverse quantization on the reconstructed DC coefficients, thus generating inverse quantized DC coefficients in Intra-MB 250. To perform the inverse quantization, VLD 220 multiplies a reconstructed DC coefficient by an intra__dc__multiplier value. For one embodiment, the intra__dc__multiplier value has a value of 8, 4, 2, or 1 based on an $intra_{13}$ $dc_{13}$ precision value specified in a header transmitted in conjunction with the picture. Subsequently, VLIW 230 performs an IQ on Intra-MB 250, thus generating a 16×16 luminance block and two 8×8 chrominance blocks. The IQ performed by VLIW 230 on a block of Intra-MB 250 with an inverse quantized DC coefficient is described below in conjunction with FIG. 5.

Figure 3:
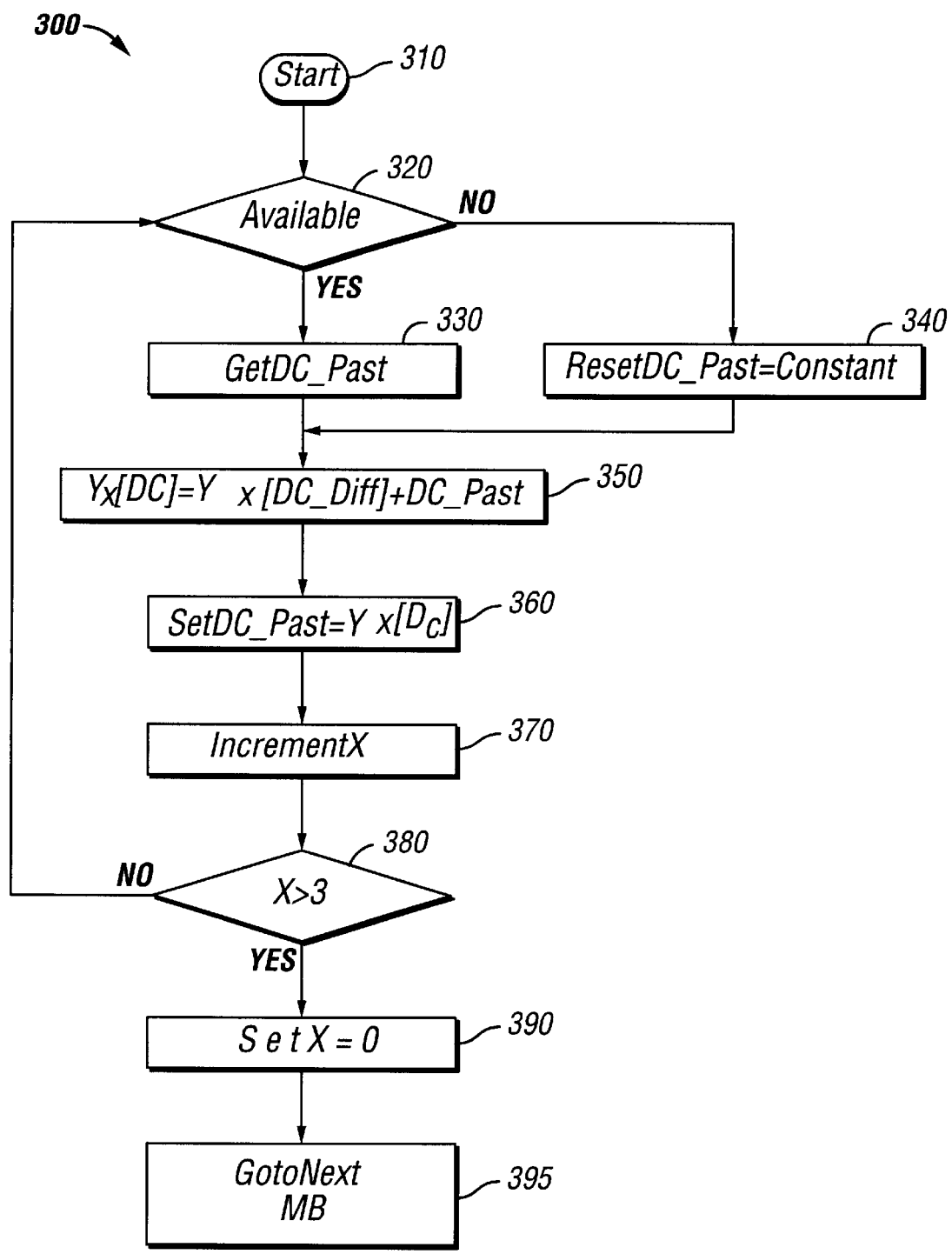
FIG. 3 shows a flow chart illustrating one embodiment of luminance DC coefficient reconstruction.

FIG. 3 shows a flow chart illustrating one embodiment of luminance DC coefficient reconstruction. In particular, flow chart 300 includes blocks 310 through 390. For one embodiment, the blocks show the steps used by a variable length decoder to generate the reconstructed DC coefficients of the luminance blocks of Intra-MB 250. For example, applying the steps of blocks 310 through 390 to VLD 220 illustrates the steps performed by VLD 220 to reconstruct the DC coefficients of blocks γ252–γ255.

As illustrated in FIG. 3, operation begins in block 310. Subsequently, in decision block 320, VLD 220 determines whether a dc_past is available. For one embodiment, a dc_past is not available because VLD 220 is processing a first Intra-MB. For another embodiment, a dc_past is not available because the stream of Intra-MBs on input 210 has been interrupted. If the dc_past value is available, block 330 is processed after block 320.

In block 330 the reconstructed DC coefficient for the luminance blocks of a previous Intra-MB (dc_past) is obtained. For one embodiment, the dc_past value is stored in accumulator 211. For an alternative embodiment, the dc_past value is stored in a register of accumulator 211. After obtaining the dc_past value block 350 is processed.

As demonstrated in decision block 320, if the dc_past is unavailable block 340 is processed. In block 340, VLD 220 resets the dc_past value to a constant. For one embodiment, the constant comprises a value of 1024, 512, 256, or 128 based on an $intra_{13\ dc}$_precision value specified in a header transmitted in conjunction with the picture. For another embodiment, the constant comprises a value determined by the MPEG standard. After resetting the dc_past value, block 350 is processed.

As illustrated in FIG. 3, block 350 is included in the loop of blocks 320 through 390. In the loop of blocks 320 through 390, for one embodiment, the DC coefficients of four luminance blocks (for example the luminance blocks in MB 250) are reconstructed by incrementing the variable 'x' shown in blocks 350, 360, 370, and 380. Following the previous example, DC 287 of block γ252 is generated in a first loop of blocks 320 through 390. In particular, in block 350, DC 287 (denoted as Y0) is reconstructed according to the equation:

$$Y0=Y0[dc\_diff]+dc\_past$$

The term dc_diff denotes the DC differential value of the decoded Intra-MB blocks γ252–γ255 prior to the reconstruction. Thus, Y0[dc_diff] indicates the DC differential value of DC 287 prior to reconstruction.

In block 360, the dc_past value is set to the Y0 value generated in block 350. Accordingly, for one embodiment, the luminance dc_past value stored in accumulator 211 is replaced with the Y0 value. Subsequently, in block 370 the value of 'x' is incremented, thus denoting the processing of Y1—i.e. the reconstruction of the DC coefficient of block γ253.

In decision block 380, the value of 'x' is compared to three. As illustrated in FIG. 3, if 'x' is less than or equal to three, block 320 is re-processed. If 'x' is greater than three, however, block 390 is processed. In block 390 'x' is set to a 0 and subsequently block 395 is processed. In block 395 the next Intra-MB is processed using the loop of blocks 320 to 390.

For one embodiment, the value of 'x' is compared to three because the Intra-MB of the present embodiment comprises four luminance blocks. Thus, comparing 'x' to three results in VLD 200 performing (1) a DC reconstruction of four luminance blocks and (2) using the final dc_past of an Intra-MB to perform the DC reconstruction for the first luminance block of a subsequent Intra-MB. For an alternative embodiment, blocks 310 through 390 are applied to chrominance block. Accordingly, the comparison value of three may be modified to process Intra-MB blocks with a different number of instances. For example, to reconstruct the DC coefficients of an Intra-MB with 2 chrominance blocks, 'x' is compared to 1 in step 380. Accordingly, during the DC coefficient reconstruction of a subsequent Intra-MB, the dc_past value of chrominance block number 2 is used to reconstruct the first chrominance DC coefficient of the subsequent Intra-MB.

Figure 4:
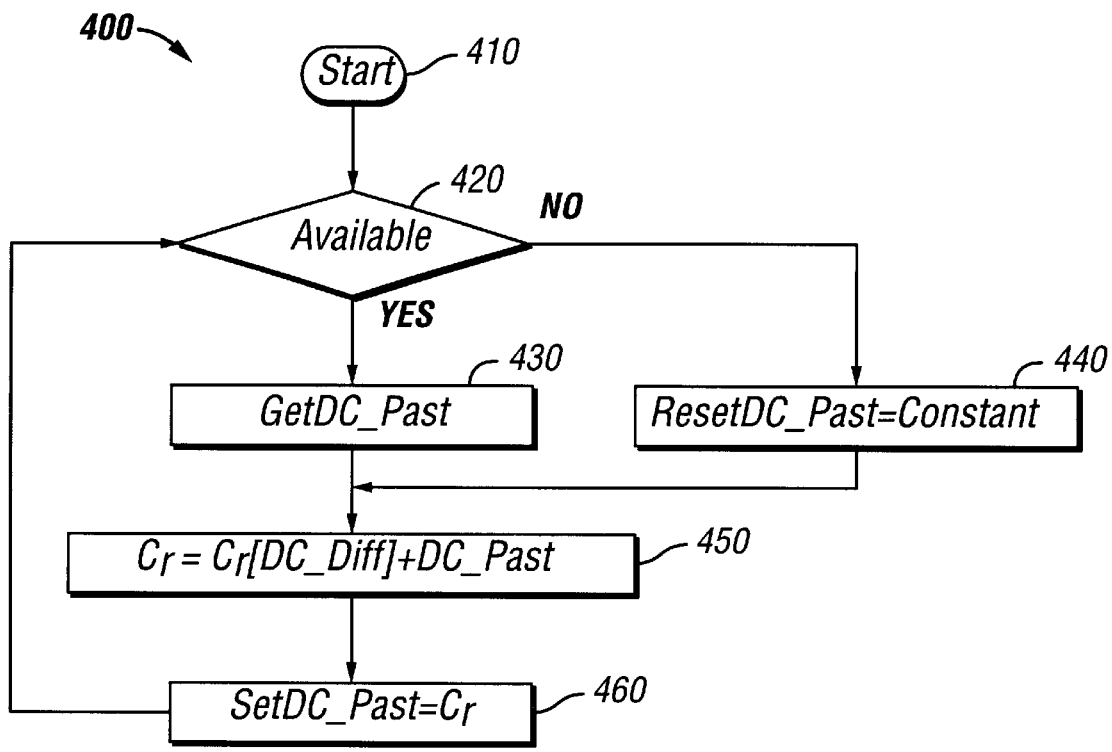
FIG. 4 shows a flow chart illustrating one embodiment of chrominance DC coefficient reconstruction.

FIG. 4 shows a flow chart illustrating one embodiment of chrominance DC coefficient reconstruction. In particular, flow chart 400 includes blocks 410 through 460. For one embodiment, the blocks show the steps used by a variable length decoder to generate the reconstructed DC coefficient of the chrominance blocks of an Intra-MB 250. For example, applying the steps of blocks 410 through 460 to VLD 220 illustrates the steps performed by VLD 220 to reconstruct the DC coefficient of block Cr 257 (DC 289).

As illustrated in FIG. 4, operation begins in block 410. Subsequently, in decision block 420, VLD 220 determines whether a dc_past is available. For one embodiment, a dc_past is not available because VLD 220 is processing a first Intra-MB. For another embodiment, a dc_past is not available because the stream of Intra-MBs on input 210 has been interrupted. If the dc_past value is available, block 430 is processed after block 420.

In block 430 the reconstructed DC coefficient for the chrominance block of a previous Intra-MB (dc_past) is obtained. For one embodiment, the dc_past value is stored in accumulator 211. For an alternative embodiment, the dc_past value is stored in a register of accumulator 211. After obtaining the dc_past value block 450 is processed.

As demonstrated in decision block 420, if the dc_past is unavailable block 440 is processed. In block 440, VLD 220 resets the dc_past value to a constant. For one embodiment, the constant comprises a value of 1024, 512, 256, or 128 based on an $intra_{13}$ dc_precision value specified in a header transmitted in conjunction with the picture. For another embodiment, the constant comprises a value determined by the MPEG standard. After resetting the dc_past value, block 450 is processed.

In block 450, the DC coefficient of the chrominance block is reconstructed. Following the previous example, DC 289 is generated in block 450. In particular, in block 450, DC 289 (denoted as Cr) is reconstructed according to the equation:

$$Cr = Cr[dc\_diff]+dc\_past$$

The term dc_diff denotes the DC differential value of the decoded block Cr 257 prior to the reconstruction. Thus, Cr[dc_diff] indicates the DC differential value of DC 289 prior to reconstruction.

In block 460, the dc_past value is set to the Cr value generated in block 450. Accordingly, for one embodiment, the chrominance dc_past value stored in accumulator 211 is replaced with the Cr value. Subsequently, block 420 is reprocessed—i.e. the reconstruction of the chrominance DC coefficient for a subsequent Intra-MB is performed. For one embodiment, the loop created by blocks 420 through 460 performs the chrominance DC coefficient reconstruction for a stream of Intra-MBs received on input 210. For another embodiment, blocks 410 through 460 illustrate the steps used by VLD 220 to reconstruct the DC chrominance coefficient (DC 288) of block Cb 256.

Figure 5:
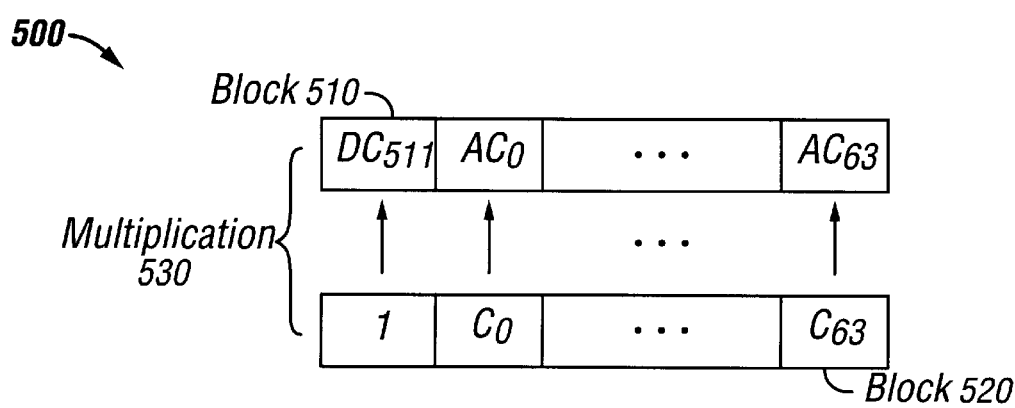
FIG. 5 shows one embodiment of a parallel AC coefficient and DC coefficient inverse quantization performed by a video decoder.

FIG. 5 shows one embodiment of a parallel AC coefficient and DC coeficient inverse quantization performed by a video decoder. In particular system 500 comprises a block 510 and a block 520. For one embodiment, block 5 corresponds to a block of Intra-MB 250 generated by VLD 220. Accordingly, block 510 comprises an inverse quantized DC coefficient (DC 511) and sixty-four AC coefficients (AC0–AC63). For another embodiment, block 520 comprises inverse quantization constants (1, C0–C63) stored in VLIW 230. For yet another embodiment, VLIW 230 performs an IQ using block 510 and block 520. In particular, the generation of the inverse quantized DC coefficient (DC 511) in block 510 allows VLIW to perform the IQ via the multiplication 530 shown in FIG. 5. The multiplication 530 illustrates the multiplication of each coefficient in block 510 with a corresponding constant from block 520. Thus as illustrated in FIG. 5, to perform the IQ of block 510, DC 511 is multiplied by a value of 1, ACO is multiplied by the constant C0, and AC63 is multiplied by the constant C63. For one embodiment, DC 511 is multiplied by a value of 1 because VLD220 performs an IQ of the DC coefficients (generated on line 225, thus the VLIW performs the IQ on the AC coefficients.

In the foregoing specification, the invention has been described with reference to specific exemplary embodiments thereof. It will, however, be evident that various modifications and changes may be made thereof without departing from the broader spirit and scope of the invention as set forth in the appended claims. For example, the present invention can be used to implement data reconstruction over a variety of multimedia protocols, such as MPEG-4. Moreover, one of ordinary skill in the art would recognize that the present invention can be implemented using a variety of software programming techniques (e.g., C++ or Assembly), hardware (e.g., VLIW processors including the VLIW processors of Equator Technologies, headquartered in Campbell, Calif.), or any combination thereof. The specification and drawings are, accordingly, to be regarded in an illustrative rather than a restrictive sense.

What is claimed is:

1. A method to perform inverse quantization in a decoder of a reconstructed macroblock, the method comprising:

receiving a transmitted coefficient of a first block comprising a reconstructed DC coefficient and plurality of AC coefficients;

providing a block of inverse quantization constants, each inverse quantization constant being respectively associated with one of said AC coefficients and said DC coefficient;

executing an operation in the decoder to multiply each said coefficient, by the inverse quantization constant associated therewith;

generating an inverse quantized DC coefficient from the reconstructed value of the transmitted coefficient; and performing said multiplication of coefficients by inverse quantization constants in parallel.

2. The method of claim 1 wherein the inverse quantization constant associated with the DC coefficient is 1.

3. A computer-readable medium having stored thereon a plurality of sequence instructions, the plurality of sequences of instructions including sequences of instructions which, when executed by a processor, cause the processors to perform the steps of:

receiving a transmitted coefficient of a first block comprising a reconstructed DC coefficient and plurality of AC coefficients;

providing a block of inverse quantization constants, each inverse quantization constant being respectively associated with and said AC coefficients and said DC coefficient providing a block;

executing an operation in the decoder to multiply each said coefficient, by the inverse quantization constant associated therewith;

generating an inverse quantized DC coefficient from the reconstructed value of the transmitted coefficient; and performing said multiplication of coefficients by inverse quantization constants in parallel.

4. A system having a plurality of devices configured to generate a reconstructed coefficient, the system comprising:

a variable length decoder, wherein the variable length decoder is operable to receive a first transmitted macro block comprising a plurality of transmitted coefficients and generate a macro block comprising a DC coefficient and a plurality of reconstructed coefficients; and a VLIW processor coupled to the variable length decoder, wherein the processor is operable to multiply said macroblock of said reconstructed coefficients by a respective inverse quantization constant for each said reconstructed coefficient wherein the VLIW processor performs multiplication of said coefficients by said respective quantization constants in parallel.

5. The system of claim 1 wherein said constant associated with said DC coefficient is 1.

* * * * *